(12) United States Patent
Malwankar et al.

(10) Patent No.: US 7,934,033 B2
(45) Date of Patent: Apr. 26, 2011

(54) PCI-EXPRESS FUNCTION PROXY

(75) Inventors: Kiron Malwankar, Saratoga, CA (US); Daniel Talayco, Mountain View, CA (US); Ali Ekici, Los Gatos, CA (US)

(73) Assignee: APRIUS, Inc., Sunnyvale, CA (US)

(*) Notice: Subject to any disclaimer, the term of this patent is extended or adjusted under 35 U.S.C. 154(b) by 41 days.

(21) Appl. No.: 12/265,695

(22) Filed: Nov. 5, 2008

(65) Prior Publication Data

US 2009/0248947 A1 Oct. 1, 2009

Related U.S. Application Data

(60) Provisional application No. 61/039,312, filed on Mar. 25, 2008.

(51) Int. Cl.
*G06F 13/36* (2006.01)
*G06F 13/00* (2006.01)

(52) U.S. Cl. ........ 710/104; 710/306; 710/311; 710/313

(58) Field of Classification Search .................... 710/316
See application file for complete search history.

(56) References Cited

U.S. PATENT DOCUMENTS

| | | | | |
|---|---|---|---|---|
| 6,212,587 | B1 * | 4/2001 | Emerson et al. | 710/107 |
| 6,795,883 | B2 * | 9/2004 | Tsai | 710/104 |
| 6,976,083 | B1 * | 12/2005 | Baskey et al. | 709/232 |
| 7,293,129 | B2 * | 11/2007 | Johnsen et al. | 710/313 |
| 7,478,178 | B2 * | 1/2009 | Torudbakken et al. | 710/31 |
| 7,549,003 | B2 * | 6/2009 | Boyd et al. | 710/104 |
| 7,565,463 | B2 * | 7/2009 | Johnsen et al. | 710/30 |
| 7,571,273 | B2 * | 8/2009 | Boyd et al. | 710/316 |
| 7,574,536 | B2 * | 8/2009 | Johnsen et al. | 710/22 |
| 7,610,431 | B1 * | 10/2009 | Watkins et al. | 710/312 |
| 7,613,864 | B2 * | 11/2009 | Torudbakken et al. | 710/312 |
| 7,620,741 | B2 * | 11/2009 | Torudbakken et al. | 710/2 |
| 7,631,050 | B2 * | 12/2009 | Boyd et al. | 709/208 |
| 2002/0147868 | A1 * | 10/2002 | Tsai | 710/104 |
| 2006/0242330 | A1 * | 10/2006 | Torudbakken et al. | 710/5 |
| 2006/0242332 | A1 * | 10/2006 | Johnsen et al. | 710/22 |
| 2006/0242333 | A1 * | 10/2006 | Johnsen et al. | 710/30 |
| 2006/0242352 | A1 * | 10/2006 | Torudbakken et al. | 710/312 |
| 2006/0242354 | A1 * | 10/2006 | Johnsen et al. | 710/316 |
| 2006/0253619 | A1 * | 11/2006 | Torudbakken et al. | 710/31 |
| 2009/0276551 | A1 * | 11/2009 | Brown et al. | 710/72 |

* cited by examiner

*Primary Examiner* — Ryan M Stiglic

(74) *Attorney, Agent, or Firm* — Gregory & Martensen LLP

(57) ABSTRACT

Embodiments are described for executing embedded functions in endpoint devices by proxy in a shared PCI Express subsystem. The shared subsystem comprises a plurality of proxy devices coupled to a PCIe fabric, wherein each one of the proxy devices is associated with an endpoint device and coupled to a controlling server through a PCIe link. An associated proxy device comprises a copy of the configuration space of the target endpoint device. Embedded functions of an endpoint device can be accessed by controlling servers through the associated proxy devices. Devices in the shared subsystem use PCI protocol to communicate. The duplication of the endpoint configuration space in the proxy device is administrated by a proxy configuration manager. The proxy device translates destination addresses in upstream and downstream transactions. A proxy interrupt conveyance mechanism relays interrupt messages from an endpoint device to the controlling server via the associated proxy device.

20 Claims, 6 Drawing Sheets

PCI-EXPRESS FUNCTION PROXY

RELATED APPLICATION

This application claims the benefit of U.S. Patent Application No. 61/039,312, filed Mar. 25, 2008, which is incorporated by reference herein.

BACKGROUND

A standard Peripheral Component Interconnect (PCI) bus is a local parallel bus that allows peripheral cards to be added into a single computer system. Examples of commercially available peripheral cards with PCI bus interface are SCSI (data storage) cards, wireless LAN add-in cards, analog and digital TV tuner add-in cards, USB, FireWire 1394 controllers, Gigabit Ethernet add-in cards, etc. The PCI bus communicates with a single CPU or multiple CPUs of the computer system through a PCI-bridge controller. Several PCI bridges may exist in a computer system and couple a diversity of input/output (IO) devices with the single CPU or multiple CPUs of the computer system.

A PCI-Express (PCIe) is a modification of the standard PCI bus. The PCIe uses a point-to-point high-speed serial communication link instead of a bus structure. In order to maintain software compatibility, it is architected with the same PCI tree structure IO interconnect topology. Consequently, a PCIe link is equivalent to a logical PCI bus, i.e., each link is assigned a bus number by the enumerating software.

PCIe was originally designed for desktops connecting a root complex (a host CPU with memory) with downstream IO devices, but has since found applications in servers, storages devices, and other communications systems. The base PCIe switching structure of a single root complex has a tree topology, which addresses PCIe endpoints through a bus numbering scheme. Currently, PCIe does not permit sharing of PCI adapters in topologies where there are multiple hosts with multiple shared PCI buses. PCIe peripherals such as Fibre Channel host bus adapters, Infiniband host channel adapters, Gigabit Ethernet network interface cards are integrated into a physical server system. This makes the IO system very inflexible as the server IO capability cannot be scaled in real-time or shared with other servers in a multi-root computing system.

CPU computational power has been doubling every 18 months following Moore's Law. Upgrading the network infrastructure by replacing the current IO interface modules with state-of-the art modules is one way to keep up with the CPU capability increase. As physical servers, especially blade servers, have limited hardware space to accommodate IO ports, and state-of-the-art IO adapters are expensive, engineers are looking for ways to share physical IO resources in multi-root server computing systems.

PCI-SIG Working Group is developing a new specification that adds IO virtualization capability to PCIe. The new specification, still in the development process, specifies two levels of IO virtualization: the single-root IO virtualization (SR-IOV) and the multi-root IO virtualization (MR-IOV). The SR-IOV provides a standard mechanism for endpoint devices to advertise their ability to be simultaneously shared among multiple virtual machines running on the same hardware platform (one host CPU). The MR-IOV allows sharing of an IO resource between multiple operation systems running on multiple hardware platforms (multiple host CPUs).

In order to support the multi-root topology, PCIe switches and IO devices should be MR-aware (i.e., they are capable of supporting a multi-root system). MR-aware IO adapters and PCIe switches must have additional register sets to support the various root-complex routings, and an MR-aware PCIe switch must contain two or more upstream ports. The MR-IOV specification requires modifications in the data link layer. A change is also necessary in the configuration software to configure the switch fabric and the MR-aware endpoint devices.

The adoption of MR-IOV requires modification in hardware and software. For that reason, MR-aware endpoint devices may not be available for a long time.

An alternative solution is to use non-transparent bridges which are interposed between root complexes and endpoint devices. The non-transparent bridge is a bridge that exposes a Type 0 control-and-status register (CSR) header on both sides and forwards transactions from one side to the other with address translation. Because it exposes a Type 0 CSR header, the non-transparent bridge appears to be an endpoint to discovery and configuration software. Since devices on one side of the bridge are not seen or exposed on the other side as in a conventional PCI bridge, this bridge is referred to as a non-transparent bridge. Non-transparent bridges add expense and complication to the PCIe system and require higher layer applications to properly complete discovery and enumeration of a system (FIG. 1).

Therefore, current IO adapters and current PCIe devices do not have IO virtualization capabilities. Existing IO adapters and PCIe switches are designed to be controlled by a single device driver in a single operating system. PCI-SIG Working Group is developing a new specification for multi-root IO virtualization (MR-IOV). The deployment of MR-IOV capable systems requires new hardware and software. MR-IOV switches and endpoints are currently not available. Non-transparent bridges are an interim solution for sharing IO resources in a multi-root server system. Its deployment requires additional installation of dedicated software in each server to access endpoints across the non-transparent bridge.

Motivation is high to have a system and method for sharing endpoints among multiple servers located in different root complexes without the need of modifying existing operating systems or deploying new MR-aware switches and MR-aware endpoint devices.

DETAILED DESCRIPTION

Figure 4:
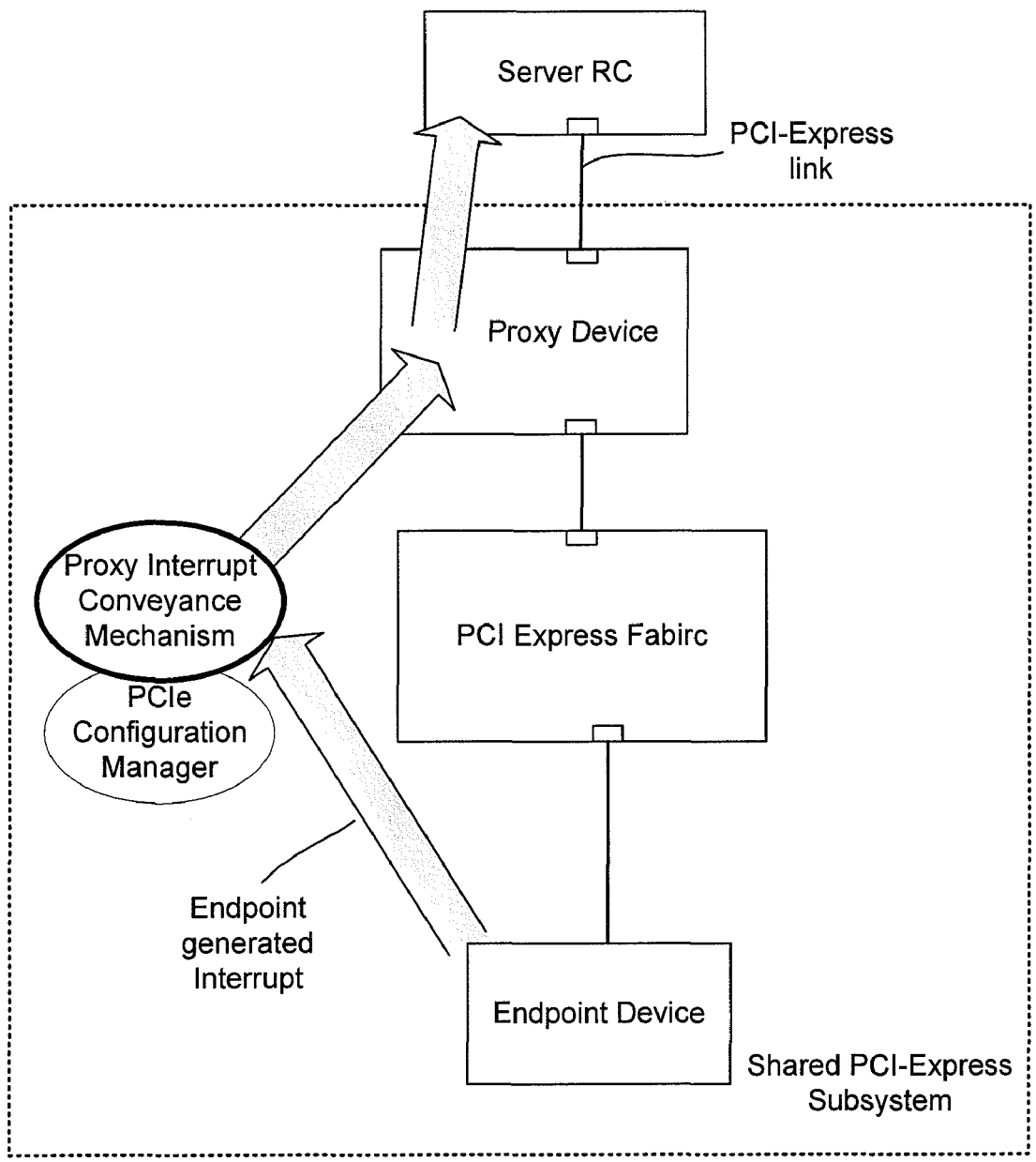
FIG. 4 shows the proxy interrupt conveyance mechanism that relays pending interrupts of the endpoint device to the server.

The embodiments described herein provide a system and method for endpoint devices that can be shared by multiple servers or root complexes connected to a shared PCIe subsystem. The sharing of endpoint devices is accomplished in an embodiment by introducing proxy devices and a proxy configuration manager component that copies the configuration space of a target endpoint device to associated proxy devices. A controlling server may be coupled to a proxy device. In one embodiment, the proxy device has at least two PCIe ports: a first port that is coupled to the controlling server and a second port that is coupled to a PCIe fabric. Both ports comprise PCIe links that may be scalable and comprise one or more high-speed lanes in accordance with the PCI-Express physical specification. In one embodiment, the proxy device comprises a copy of the configuration space of a target endpoint device. The controlling server accesses a function of the target endpoint device through the associated proxy device, which executes the target function by proxy. The configuration space of the proxy device may comprise the PCI configuration registers, power management capabilities, message signaled interrupt (MSI) and/or MSI-eXtended (MSI-X) capabilities, and PCIe extended capabilities. The proxy device may be capable of receiving interrupt transactions from a proxy interrupt conveyance mechanism and communicating the interrupt transactions to a controlling server over a PCIe link. The proxy device may expose multiple functions imbedded within endpoint devices to the server side of the system and execute them by proxy. Each of these functions can provide proxy functionality to represent a different endpoint function in the shared subsystem. The copying of the configuration space of a targeted endpoint device to the proxy device is performed by the proxy configuration manager following the enumeration process. The proxy configuration manager typically coexists with the PCIe configuration software (FIG. 2), but is not so limited. In addition, a proxy interrupt conveyance mechanism may be implemented to facilitate the communication of pending interrupts from endpoint devices to controlling servers (FIG. 4).

The proxy devices of an embodiment expose functions of target endpoint devices to multiple servers without the need of having multi-root aware PCIe switches and multi-root aware endpoint devices. Servers therefore access functions of endpoint devices by sending request transactions to their associated proxy devices which then forward the transactions downstream to the target endpoint devices after checking for errors and performing an address translation. The proxy devices also forward completion transactions coming from the endpoint devices to the corresponding servers after checking for errors and performing an address translation.

In an embodiment, the proxy device exposes a function of an endpoint device to a server or to a root complex. In another embodiment, the proxy devices may expose multiple functions of a target endpoint device to a root complex comprising one or more servers. The controlling server sends request transactions to the proxy device that inspects the transactions for errors prior to forwarding them downstream to the target endpoint device. The inspection may occur in many levels of the transaction, e.g., in the transaction layer, in the data link layer and/or in the physical layer.

The embodiments described herein provide per-function granularity of sharing, wherein each individual function of an endpoint device may be accessed independently in a multi-root system using a proxy mechanism.

In another embodiment, the endpoint device conveys interrupt events to the controlling server through the proxy interrupt conveyance mechanism.

In still another embodiment, the proxy configuration manager automatically notifies the controlling server of Hot-Plug events. The embodiments herein enable the addition of peripheral components to and removal of peripheral components from the system without affecting the system setup.

In yet another embodiment, the proxy configuration manager coexists with the PCIe configuration software of the computer server system. The proxy configuration manager may dynamically assign more functions or other functions to a controlling server according to its needs.

Figure 1:
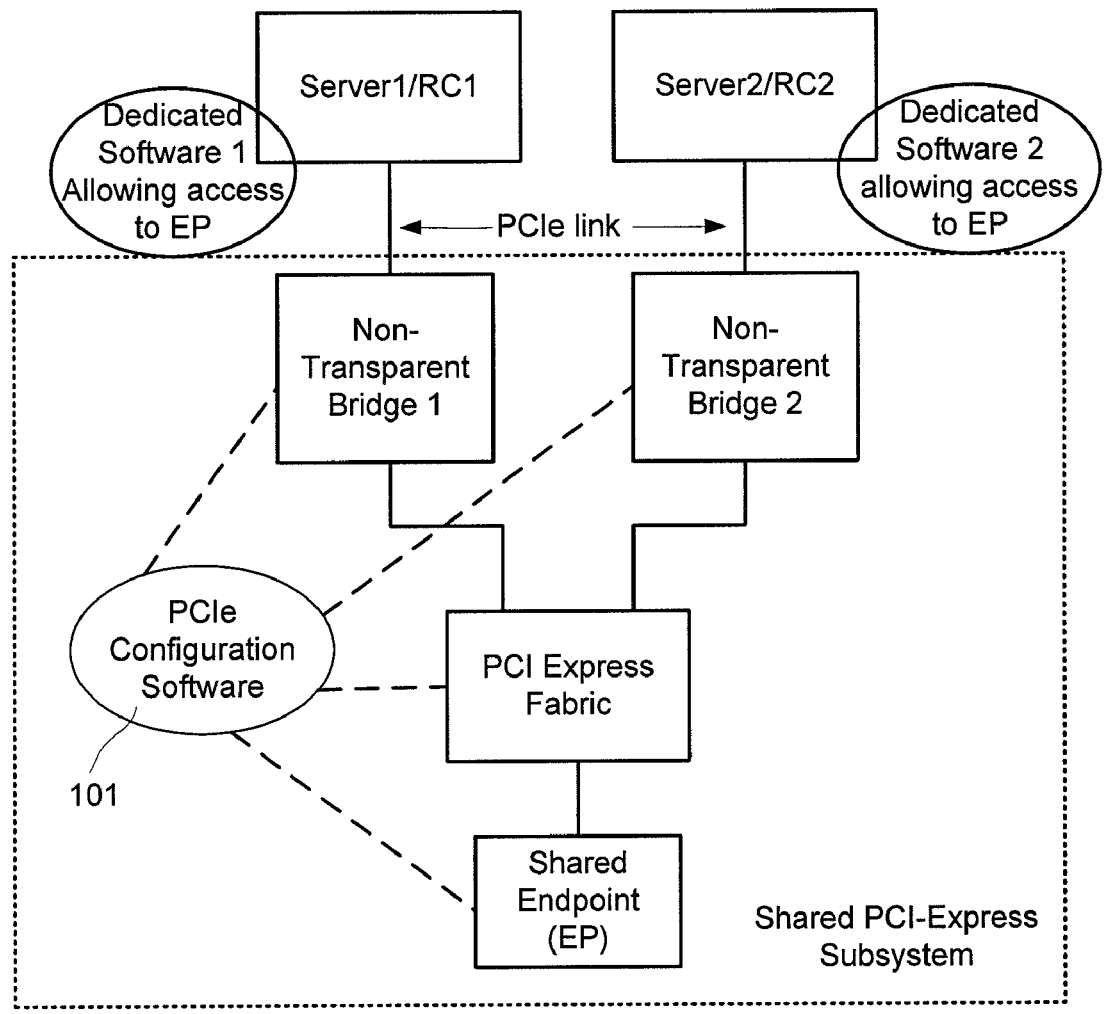
FIG. 1 shows a deployment of resource sharing by means of non-transparent bridges.

FIG. 1 shows two servers, each with its own PCIe root complex, accessing a shareable endpoint using non-transparent bridges (NTB). As known in the art, NTB topologies require enumeration software on both sides of the bridge as the discovery and configuration cannot see the other side. So the NTB deployment requires an additional software driver layer in the server. FIG. 1 indicates this through a showing of each server having additional software, which, in an embodiment includes a driver for each NTB. The problem with the NTB approach is that the driver is specific to the hardware and software running on the server, so any change to the hardware or software on the server would require changes to that driver.

Figure 2:
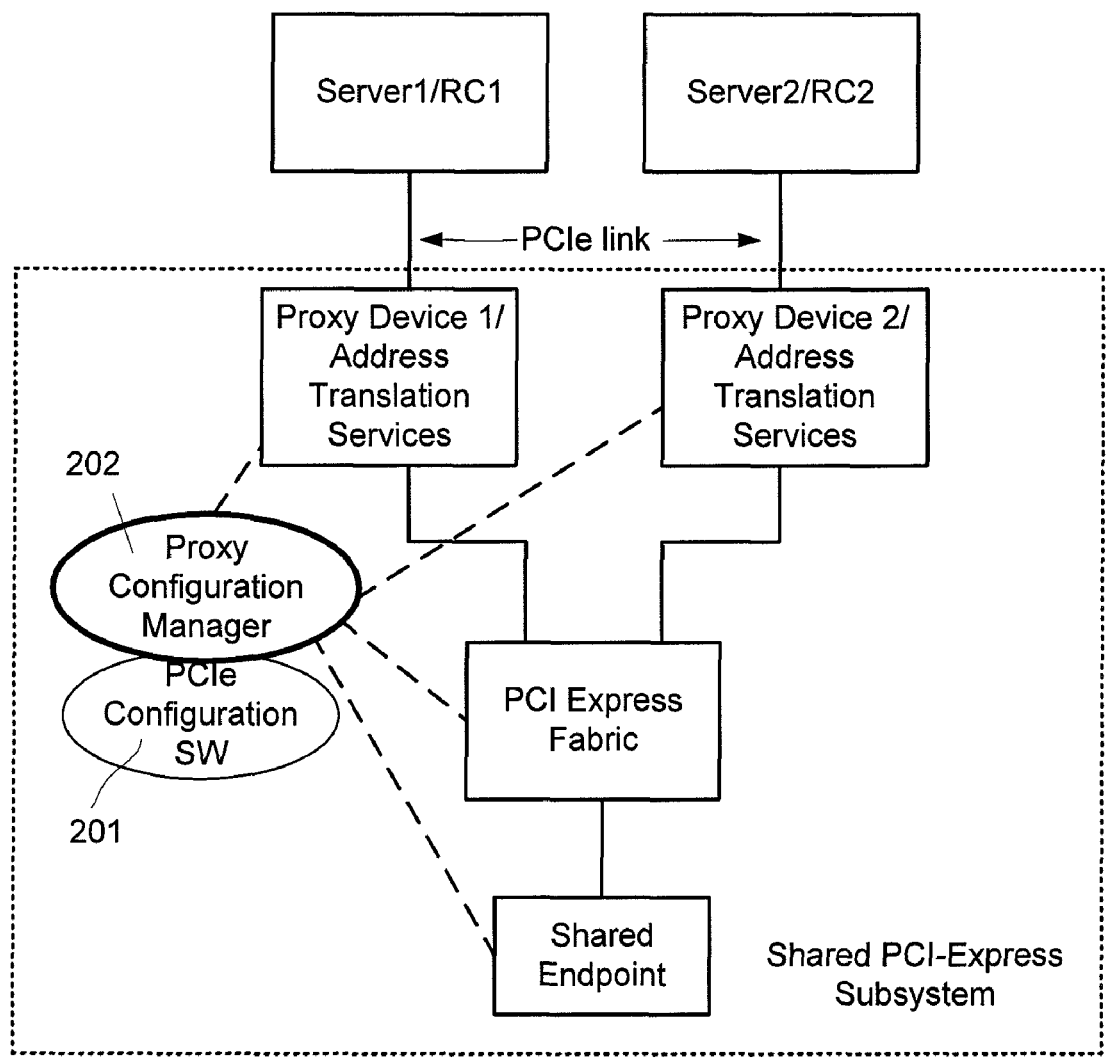
FIG. 2 shows an exemplary embodiment of the present invention with two proxy devices associated with the corresponding server/root complex and the proxy configuration manager.
Figure 3:
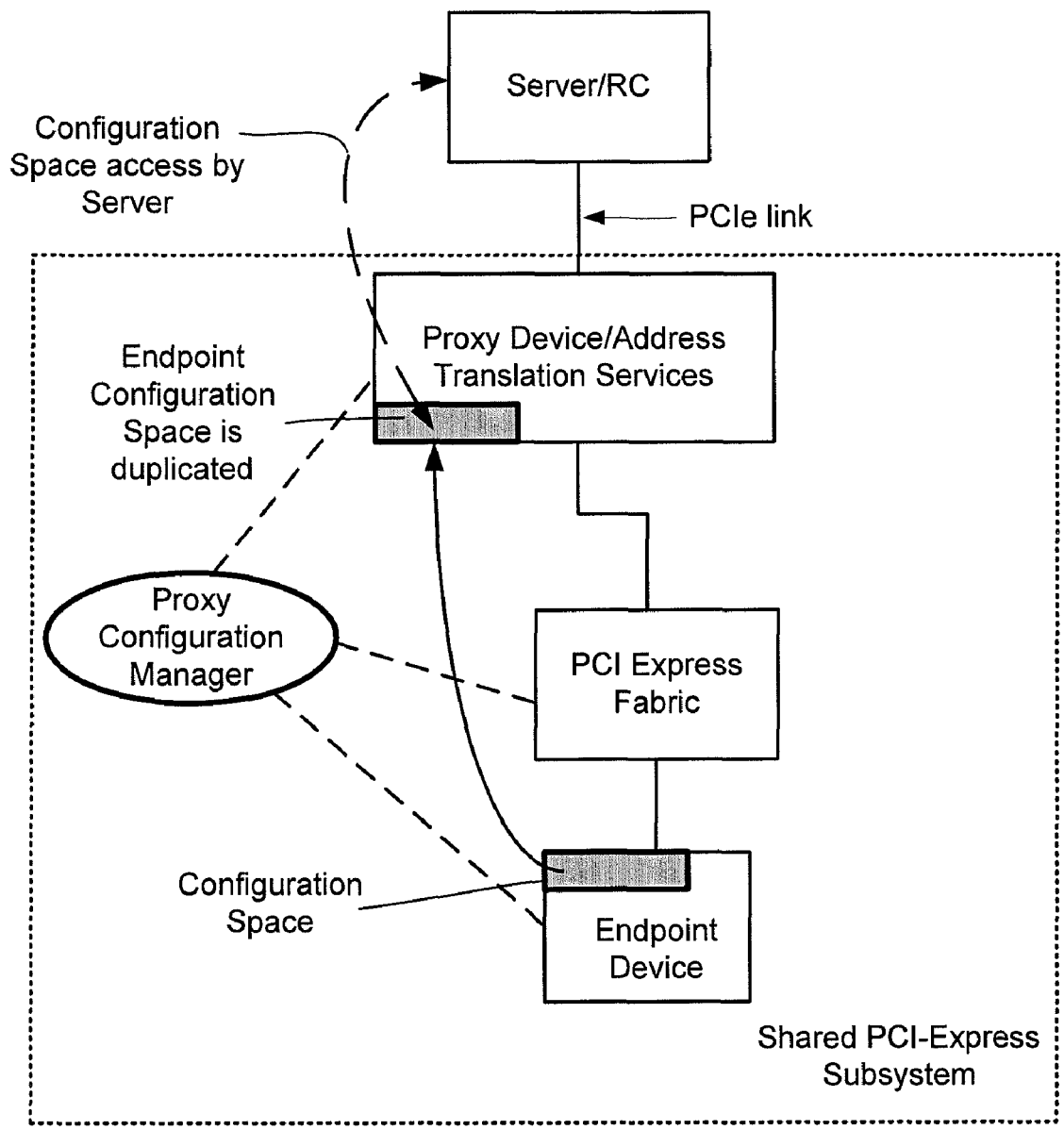
FIG. 3 shows the target endpoint device's configuration space is duplicated to the proxy device by the proxy configuration manager.

FIG. 2 shows an embodiment including two servers, each coupled to a proxy device. At startup time, the legacy configuration software 201 enumerates the PCI buses and discovers PCIe devices in the system. A proxy configuration manager 202, configured to be aware of proxy devices, copies the configuration space of a target endpoint device to a proxy device associated with a controlling server.

The proxy configuration manager 202 starts the discovery process to have a complete view of the current system configuration. Upon completion of the discovery, the proxy configuration manager initializes the process of copying the configuration space of a target endpoint device to a proxy device associated with the controlling server. Because the proxy configuration manager has the complete view of the fabric configuration, it can resolve any resource conflicts that may exist between requesting servers.

The proxy configuration manager 202 of an embodiment co-exists with the system configuration software 201. Both the proxy configuration manager 202 and the system configuration software can reside in a server or preferably in a separate processor located in the shared PCI Express subsystem.

The proxy device uses a Type 0 configuration header, which presents the entire subsystem as a single "virtual endpoint" device to the server. The proxy device can have all registers required by the PCI Specification and may be fully compatible with existing deployed PCI software, i.e., it is enumerable as part of a tree through a PCI device enumeration mechanism.

The proxy device executes by proxy a function of the target endpoint device that is located at the downstream of a fabric. When the controlling server issues a transaction request, it addresses the transaction to the associated proxy device which examines its contents. If no errors have been found, the proxy device will translate the address a target endpoint device and send the transaction downstream. A completion transaction packet of the target endpoint device is routed back to the controlling server the same way, i.e., the completion transaction packet is routed back to the associated proxy device, which then checks for transmission errors prior to forwarding the transaction packet to the controlling server. The checking of transmission errors can be performed in the transaction layer, in the data link layer and/or the physical layer. For example, the checking of data integrity in the transaction layer can be performed by comparing the received ECRC with a recalculated CRC (cyclic redundancy check) value of the received transaction layer data. The transaction layer data is considered error free when there is a match between the recalculated CRC value and the received ECRC. Similarly, the checking of data integrity in the data link layer can be performed by comparing the received LCRC with a recomputed CRC value of the received data link layer information. The data link layer information is considered error free when the recomputed CRC value matches the received LCRC value. The CRC verification mechanism (calculation and comparison) can be implemented in dedicated hardware, firmware or software using a processor computing and memory resource. The address translation can be one of the direct address translations where the addresses in the transactions are translated by adding an offset value or by using a lookup table.

The proxy device may also have a second upstream PCIe link for backup purposes. For example, if the controlling server fails for some reasons, the proxy configuration manager can reconfigure the proxy device to couple to a backup server.

The proxy device can be implemented in a field programmable gate array (FPGA), an application specific integrated circuit (ASIC), or a processor with dedicated hardware and software for address translation, flow control buffering and extended configuration support. The proxy device comprises extended buffering for flow control between the shared subsystem and the associated server. The proxy device's configuration space not only has a structure similar to the configuration space of a PCIe-compliant device, but also includes other functionalities such as power management capabilities, message signaled interrupt (MSI) capabilities, and PCIe extended capabilities to name a few. Furthermore, the proxy device includes flow control buffering for congestion management between the shared subsystem and the associated server. Moreover, the proxy device includes a mechanism for receiving MSI and/or MSI-X transactions and for directing them to the associated server. Additionally, the proxy device includes a mechanism for checking transaction errors.

The proxy device may support both the legacy PCI interrupt and the native PCIe interrupt delivery. The legacy PCI-compatible interrupt mechanism asserts one of the four (4) interrupt pins (INTA#, INTB#, INTC#, INTD#) to request interrupt service. The pins are then de-asserted when the corresponding interrupt service accesses a specific register. The native PCIe message signaled interrupt (MSI) is defined in the PCI Local Bus Specification Rev 3.0. MSI-X is an enhancement to MSI and is also defined in the PCI Local Bus Specification Rev 3.0. MSI or MSI-X allows an endpoint device to have multiple interrupt vectors. A vector may include an address field and a data field. The proxy device may indicate its support for MSI and/or MSI-X via the MSI Capabilities Registers. The proxy device may dedicate an interrupt register set for each PCIe function.

Embodiments herein also comprise a proxy interrupt conveyance mechanism (FIG. 4). In one embodiment, an endpoint device alerts the proxy interrupt conveyance mechanism about pending interrupts by generating and sending MSI memory write transactions. The proxy interrupt conveyance mechanism analyzes the MSI to check for errors and to determine which function of the target endpoint device has pending interrupts. FIG. 4 only shows one endpoint device for clarity reason, it is understood that the proxy interrupt conveyance mechanism can handle many interrupt transactions coming from a plurality of endpoint devices. Similarly, only one proxy device associated with one server is shown for clarity reason, it is understood that the proxy interrupt conveyance mechanism may direct multiple MSIs and/or MSI-Xs to a plurality of proxy devices, each one of the proxy devices is coupled to an associated controlling server through a PCIe link. The proxy interrupt conveyance mechanism may verify the validity of the received MSI or MSI-X transactions prior to forwarding them further to the associated proxy devices. For example, the MSI transaction is valid if its physical length is a DWORD (double word or 4 bytes), and a MSI-X transaction is valid if its physical length is more than four bytes and/or if it has a valid signature byte. In addition, the proxy interrupt conveyance mechanism may operate in tandem with the proxy configuration manager to convey pending interrupts to the controlling server by configuring an appropriate interrupt register set in the proxy device, which then sends a corresponding interrupt message to the server.

In an embodiment, the proxy interrupt conveyance mechanism may be implemented in hardware, firmware, software, or a combination thereof. For example, the proxy interrupt conveyance mechanism can be implemented with a data processing unit available in the fabric and/or co-located with the proxy configuration manager. The proxy interrupt conveyance mechanism is capable of receiving multiple MSIs coming from a plurality of endpoint devices and may comprise an interrupt data buffer to maintain pending interrupts. The proxy interrupt conveyance mechanism may comprise a mechanism for verifying the validity of received MSI or MSI-X transactions before they are stored in the buffer or before they are conveyed to the corresponding proxy devices. In addition, the proxy interrupt conveyance mechanism may comprise a priority checker to determine the priority of pending interrupts that are maintained in the interrupt data buffer. For example, the priority values can be predefined and maintained in a memory. Higher priority interrupts may be transmitted first to the corresponding controlling servers via their associated proxy devices to improve system performance.

In another embodiment, the proxy interrupt conveyance mechanism polls function interrupts pending in the target endpoint device. For example, when an endpoint device signals an interrupt, it sets a bit within a device specific register to indicate that an interrupt is pending. This register is read by the proxy interrupt conveyance mechanism, which then initiates an interrupt configuration process by configuring certain bits in a Configuration Status register of the proxy device to alarm an interrupt is pending. The proxy device communicates pending interrupt events to the corresponding controlling server.

An embodiment described herein can be a combination of hardware, firmware and software components. The embodiments herein enable multi-root complexes to share a common endpoint device. The sharing is down to an individual function level of a target endpoint device. The proxy configuration manager and the proxy interrupt conveyance mechanism can be co-located, but are not so limited. They can be implemented with any commercially available processors suitable for storing and executing program codes, or they can be implemented as an FPGA or an ASIC device, for example.

Endpoint devices of an embodiment can be any PCIe adapters that have one or more functions enumerable through the PCI Express configuration protocol. Examples of such PCIe endpoint devices are SCSI and iSCSI add-in cards, Gigabit Ethernet (GbE) and 10 GbE add-in cards, Fibre Channel and Infiniband adapter cards, and other functions imbedded within an endpoint device.

Figure 5:
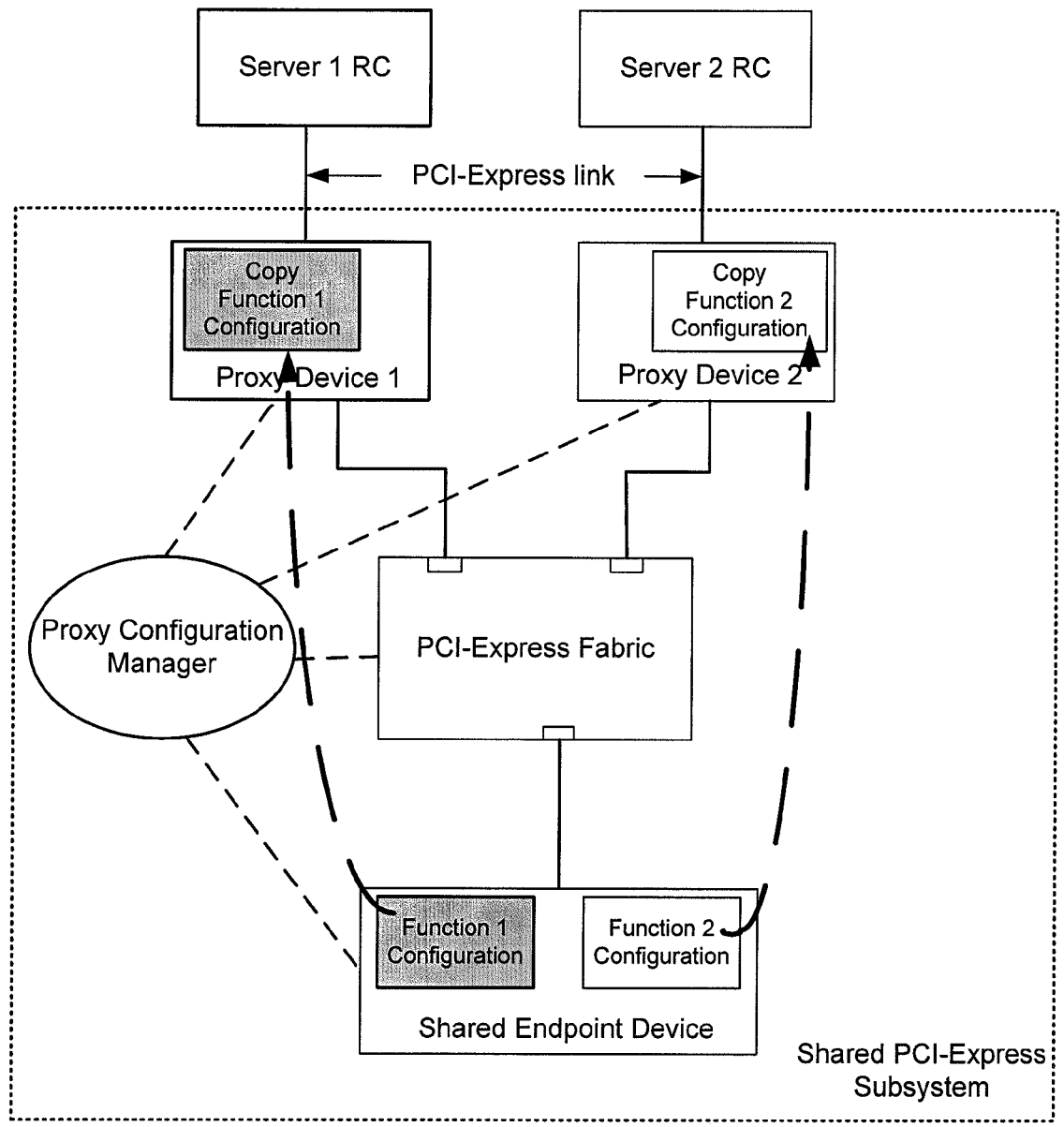
FIG. 5 shows that multiple functions in the endpoint may be shared independently to different servers using the proxy mechanism.

An embodiment described herein and shown in FIG. 5 includes a configuration in which two functions of an endpoint device are accessed individually by two servers located in two separated root complexes. Server 1 accesses function 1 of the shared endpoint device by sending transactions to proxy device 1. And proxy device 2 is viewed as it was the function 2 of the shared endpoint device from the perspective of server 2.

The embodiments herein comprise proxy devices that are implemented in the form of an ASIC, an FPGA, and/or a processor with dedicated hardware and software for address translation, flow control buffering, legacy PCI interrupts and MSI/MSI-X capabilities, and for extended configuration space support. A proxy device further comprises a primary PCIe port coupled to a controlling server and a secondary PCIe port coupled to a PCIe fabric. The proxy device operates in conjunction with a proxy configuration manager that may further include a proxy interrupt conveyance mechanism.

Figure 6:
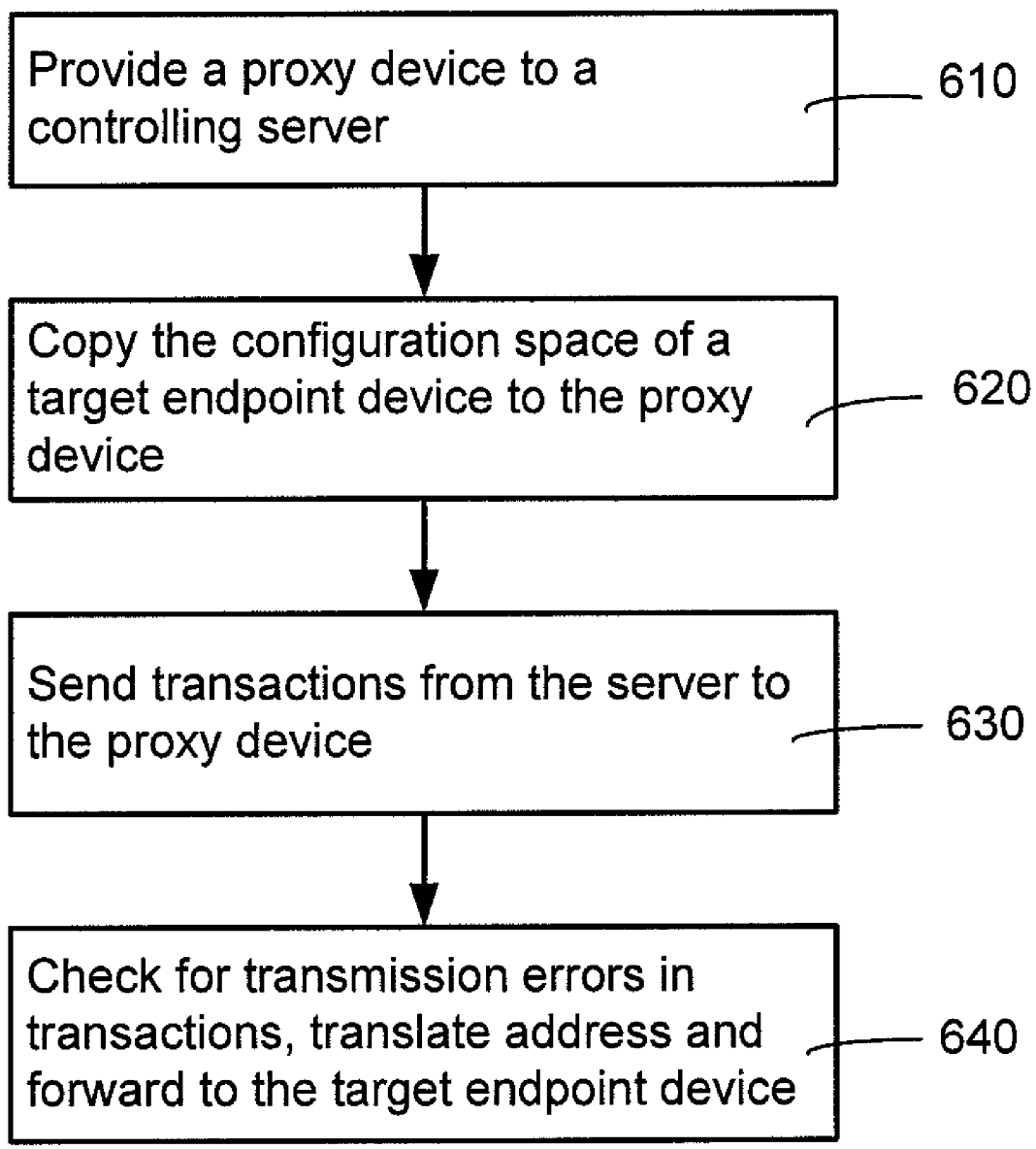
FIG. 6 shows a simplified diagram of a method according to an embodiment of the present invention.

The embodiments herein provide a method for executing functions of endpoint devices by proxy through proxy devices that comprise copies of the configuration space of the endpoint devices. The method provides a proxy configuration manager that determines endpoint capabilities and provides a copy of the configuration space to a proxy device associated with a controlling server. A flow diagram of the method is shown in FIG. 6. At 610, a proxy device is coupled with a controlling server via a PCIe link. At 620, the proxy configuration manager copies the configuration space of a target endpoint device to the proxy device which is coupled to the controlling server. The proxy configuration manager can convey hot-plug events to the controlling server by reconfiguring the associated proxy device. For example, when a 100 Mb Ethernet port has been removed or a GbE port has been added to the target device, the proxy configuration manager will update the proxy device with a new copy of the configuration space. The proxy device then informs the controlling server that a function in the target device has changed. At 630, the server sends transactions to the associated proxy device to scan the change. At 640, the proxy device checks transactions for errors, translates the destination address and forward request transactions to the target endpoint device. The target device sends completion transactions back to the controlling server the same way, i.e., via the associated proxy device, which checks for transmission errors and performs an address translation prior to forwarding the completion transactions upstream to the controlling server.

The embodiments herein further comprise a method of relaying interrupt messages of endpoint devices by a proxy interrupt conveyance mechanism to proxy devices. An associated proxy device can immediately forward the interrupt transaction to the controlling server after having received it from the proxy interrupt conveyance mechanism.

The present invention thus provides systems and methods for enabling servers in a multi-root system to share functions embedded in endpoint devices in a PCI Express fabric. Functions of a target endpoint device are presented to a controlling server through an associated proxy device. Servers, proxy devices and endpoint devices use PCI Express transaction protocol to communicate. A proxy configuration manager copies the configuration space of a target endpoint device to a proxy device associated with a controlling server. The present invention further provides a proxy interrupt conveyance mechanism that relays pending interrupts from endpoint devices in the shared subsystem to the appropriate controlling servers.

The description of the embodiments herein has been described for purposes of illustration, and is not meant to be exhaustive or limited to the embodiments in the form disclosed. Many modifications and variations will be apparent to those of ordinary skill in the art without departing from the scope of the embodiments herein defined by the appended claims.

What is claimed is:

1. A PCI-Express (PCIe) function proxy subsystem for enabling a plurality of servers to access a plurality of functions residing in a plurality of endpoint devices comprising:

a PCIe fabric comprising at least one PCIe switch operable to couple the plurality of endpoint devices with a plurality of proxy devices; and a proxy configuration manager for configuring each one of the plurality of proxy devices;

wherein each one of the plurality of proxy devices includes a memory configuration space, wherein the proxy configuration manager copies a configuration space of a target endpoint device to the memory configuration space of an associated proxy device, wherein the associated proxy device is coupled to a controlling server for executing by proxy a specific function of the target endpoint device.

2. The PCI-Express function proxy subsystem of claim 1, wherein each one of the plurality of proxy devices is coupled with one of the plurality of servers through a PCI-Express high speed serial link comprising at least one lane.

3. The PCI-Express function proxy subsystem of claim 1, wherein the associated proxy device is viewed as the target endpoint device from the perspective of the controlling server.

4. The PCI-Express function proxy subsystem of claim 1, wherein the associated proxy device further performs address translation for upstream and downstream transactions between the target endpoint device and the controlling server.

5. The PCI-Express function proxy subsystem of claim 1, wherein at least one of the proxy devices further comprises a flow control buffering for congestion management.

6. The PCI-Express function proxy subsystem of claim 1, wherein at least one of the proxy devices further comprises a mechanism for receiving at least one of message signaled interrupt (MSI) and MSI-X transactions, and for directing them to the controlling server.

7. The PCI-Express function proxy subsystem of claim 1, wherein each proxy device of the proxy devices further comprises extended flow control buffering for congestion management.

8. The PCI-Express function proxy subsystem of claim 1, wherein the configuration space of the target endpoint device is in accordance with the PCI Specification.

9. The PCI-Express function proxy subsystem of claim 1, wherein the proxy configuration manager further comprises a proxy interrupt conveyance mechanism.

10. The PCI-Express function proxy subsystem of claim 9, wherein the proxy interrupt conveyance mechanism communicates interrupt transactions from the target endpoint device to the associated proxy device.

11. The PCI-Express function proxy subsystem of claim 9, wherein the proxy interrupt conveyance mechanism verifies the validity of interrupt transactions prior to directing them to the associated proxy device.

12. The PCI-Express function proxy subsystem of claim 9, wherein the proxy interrupt conveyance mechanism determines priority of interrupt transactions and handles them correspondingly.

13. A method for distributing functions embedded in endpoint devices to a plurality of servers in a PCI-Express subsystem, the method comprising:

providing a plurality of proxy devices, each one of the plurality of proxy devices coupled to one of a plurality of servers;

copying a PCI configuration space of a target endpoint device to a memory configuration space of an associated proxy device, the associated proxy device coupled to a controlling server via a PCIe link; and executing a specific function of the target endpoint device through the associated proxy device.

14. The method of claim 13, wherein the controlling server communicates with the associated proxy device using transaction packets in accordance with a PCI Express protocol.

15. The method of claim 13, wherein the associated proxy device further comprises a checking mechanism for detecting transaction errors.

16. The method of claim 13, wherein the associated proxy device further comprises an address translation mechanism for translating destination addresses embedded in upstream and downstream transaction packets.

17. The method of claim 16, wherein the address translation mechanism is one of the direct offset translation mechanism and a lookup table-based translation mechanism.

18. The method of claim 13, wherein the copying the configuration space is performed by a proxy configuration manager.

19. The method of claim 18, wherein the proxy configuration manager further comprises a proxy interrupt conveyance mechanism.

20. The method of claim 19, wherein the proxy interrupt conveyance mechanism further comprises:
  receiving at least one of MSI and MSI-X interrupt transactions from endpoint devices;
  verifying the validity of the interrupt transactions; and
  directing them to the associate proxy device if interrupt transactions are valid.

* * * * *